(12) United States Patent
Kozimor et al.

(10) Patent No.: US 6,231,936 B1
(45) Date of Patent: *May 15, 2001

(54) RADIATION TOLERANT POLYPROPYLENE AND ITS USEFUL ARTICLES

(75) Inventors: Reneé A. Kozimor, Hawthorn Woods, IL (US); Robert C. Portnoy, Houston, TX (US)

(73) Assignee: Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,000

(22) Filed: May 9, 1997

Related U.S. Application Data (63) Continuation of application No. 08/521,082, filed on Aug. 29, 1995, now abandoned.

(51) Int. Cl.[7] .................................................... B32B 27/32
(52) U.S. Cl. .................. 428/34.7; 428/35.7; 428/500; 428/515; 428/516; 428/511; 428/461; 525/240; 524/86; 524/106; 522/211; 426/240; 422/22; 206/530; 206/531
(58) Field of Search ................................ 525/240; 422/22; 522/112, 911; 524/108, 86; 206/530, 531; 426/240; 428/515, 516, 500, 35.7, 34.7, 461, 511

(56) References Cited

U.S. PATENT DOCUMENTS

| | | | |
|---|---|---|---|
| 4,096,242 | * 6/1978 | Strobel | 424/59 |
| 4,110,185 | 8/1978 | Williams et al. | 522/79 |
| 4,187,212 | * 2/1980 | Zinke et al. | 260/45.8 NT |
| 4,274,932 | 6/1981 | Williams et al. | 522/80 |
| 4,395,510 | 7/1983 | Minami et al. | . |
| 4,395,519 | 7/1983 | Minami et al. | 525/240 |
| 4,467,065 | 8/1984 | Williams et al. | 524/296 |
| 4,563,259 | 1/1986 | Rayner | 524/99 |
| 4,569,736 | 2/1986 | Kosegaki et al. | 523/105 |
| 4,845,137 | 7/1989 | Williams et al. | 524/108 |
| 4,888,369 | 12/1989 | Moore, Jr. | 524/100 |
| 4,931,230 | 6/1990 | Krueger et al. | 264/6 |
| 4,948,841 | 8/1990 | Kasahara et al. | 525/240 |
| 4,959,402 | 9/1990 | Williams et al. | 524/99 |
| 5,078,925 | 1/1992 | Rolando et al. | 264/6 |
| 5,140,073 | 8/1992 | Rolando et al. | 525/240 |
| 5,209,984 | 5/1993 | Rolando et al. | 428/516 |
| 5,254,378 | 10/1993 | Krueger et al. | 428/34.1 |
| 5,258,419 | 11/1993 | Rolando et al. | 522/109 |
| 5,266,392 | 11/1993 | Land et al. | 442/400 |
| 5,340,848 | 8/1994 | Asanuma et al. | 522/157 |
| 5,358,792 | 10/1994 | Mehta et al. | 428/516 |
| 5,376,716 | 12/1994 | Nayak et al. | 524/295 |
| 5,392,590 | 2/1995 | Ambrose et al. | 53/425 |
| 5,425,896 | * 6/1995 | Speer et al. | 252/188.28 |
| 5,468,792 | * 11/1995 | Metrick et al. | 524/108 |
| 5,494,651 | * 2/1996 | Braca et al. | 514/114 |
| 5,601,889 | * 2/1997 | Chundury et al. | 428/34.3 |
| 5,614,315 | * 3/1997 | Kondo et al. | 428/332 |
| 5,665,273 | 9/1997 | Rasberger et al. | 252/397 |

FOREIGN PATENT DOCUMENTS

| | | |
|---|---|---|
| 0 318 049 A1 | 5/1989 | (EP) . |
| 0 380 145 A1 | 1/1990 | (EP) . |
| 0 431 475 A2 | 6/1991 | (EP) . |
| 4-214709 | 8/1992 | (JP) . |
| 4-214750 | 8/1992 | (JP) . |
| 4-332740 | 11/1992 | (JP) . |
| 5-132815 | 5/1993 | (JP) . |
| WO 90/06691 | 6/1990 | (WO) . |
| WO 92/14784 | 9/1992 | (WO) . |
| WO 95/14739 | 6/1995 | (WO) . |

OTHER PUBLICATIONS

Michael Jefferies, "The Marketing Challenge Created By Single Site Catalysts in Polyolefins", *1991 Specialty Polyolefins Conference*, Sep. 24, 1991, p. 43–55.

M.R. Rifi, H.K. Ticker and M.A. Corwin, "Flexomer™ Polyolefins: A Bridge Between Polyethylene and Rubbers", Union Carbide Sales Bulletin, 1990.

R.C. Portnoy and V.R. Cross, "Method for Evaluating the Gamma Radiation Tolerance of Polypropylene for Medical Device Applications", ANTEC '91 (1991).

L. Wild, T.R. Ryle, D.C. Knobeloch, and I.R. Peat, "Determination of Branching Distributions in Polyethylene and Ethylene Copolymers", *Journal of Polymer Science*, Polymer Physics Edition, vol. 20, 441–455 (1982).

* cited by examiner

Primary Examiner—Paul Thibodeau
Assistant Examiner—D. Lawrence Tarazano
(74) Attorney, Agent, or Firm—Darrell E. Warner; Gerald L. Harris; Frank E. Reid

(57) ABSTRACT

Provided are articles such as packaging materials and medical devices having enhanced tolerance to radiation and heat, produced from a blend of from about 99% to about 50% by weight homo or copolymerized polypropylene and about 1% to about 50% by weight polyethylene produced by single-site catalysis, such polyethylene having a MWD between about 1 and about 4, and a CDBI greater than about 45%. Optionally, other blend components may be added, such as hindered amine stabilizers, secondary antioxidants, clarifying nucleators and secondary antioxidants. Also provided are processes for producing such articles.

53 Claims, 5 Drawing Sheets

RADIATION TOLERANT POLYPROPYLENE AND ITS USEFUL ARTICLES

This is a continuation, of application Ser. No. 06/521,082, filed Aug. 29, 1995 now abandoned.

FIELD OF THE INVENTION

This invention relates generally to olefinic polymers. More particularly, this invention relates to a process for imparting radiation tolerance to polypropylene, and to uses of such radiation tolerant polypropylene.

BACKGROUND OF THE INVENTION

Polypropylene is an excellent material for use in a variety of applications, particularly medical and food packaging applications. Polypropylene is shatter resistant, resistant to most chemical agents, inexpensive, easily formed, easily handled, and may be incinerated or recycled. Currently available polypropylene is subject to certain limitations, however. For example, polypropylene materials tend to be somewhat cloudy or translucent rather than clear. Also, typical polypropylene tends to soften and deform when sterilized at high temperature by steam or turn yellow and/or become brittle when treated with high energy radiation, particularly beta and gamma radiation.

Beta radiation, such as from an electron beam, or gamma radiation, such as from a cobalt-60 source, is often used to sterilize medical equipment. This is a particularly convenient means of sterilization since the items may be packed in bulk, or in individually sealed clean packages, and irradiated after packaging. Such treatments yield sterile instruments and devices without the need for special handling or repackaging after sterilization. Thus, sterility and enhanced patient safety are assured. However, because polypropylene tends to degrade when exposed to sterilizing levels of radiation, such treatment is generally inappropriate for medical devices incorporating polypropylene components.

But for this limitation, polypropylene would be very useful for making a tremendous number of useful items including syringe barrels, culture dishes, tissue culture bottles, intravenous catheters and tubing, and bags or bottles, surgical probes, suture material, and other goods.

The potential usefulness of polypropylene has been recognized for some time. Others in the field have attempted to overcome the property limitations by numerous means. In U.S. Pat. No. 4,110,185, for example, Williams, Dunn, and Stannett describe the use of a non-crystalline mobilizing agent in polypropylene formulations to increase the free volume of the polymer and prevent radiation embrittlement. In U.S. Pat. No. 4,845,137, Williams and Titus describe a polypropylene composition which is stable to sterilizing radiation, comprising polypropylene of narrow MWD, a liquid mobilizing additive, a hindered amine compound, and a clarifying agent. While these additives generally appear to enhance radiation-tolerance, mobilizing additives tend to be oily or greasy. This can contribute to processing difficulties and product flaws.

Other inventions attempting to stabilize polypropylene against the effects of high energy radiation employ syndiotactic polypropylene. EP-A2-0 431 475, describes making a radiation resistant polypropylene resin composition suitable for the preparation of molded articles in which physical properties "scarcely deteriorate during sterilization by radiation" by utilizing substantially syndiotactic polypropylene. The composition may also include a phosphorous containing anti-oxidant, an amine containing antioxidant, and a nucleating agent.

JP 04-214709 apparently describes ethylene/propylene copolymers with at least 50% syndiotacticity which have improved radiation tolerance. Such copolymers are produced by specific chiral metallocene-type catalysis and are preferably compounded with phosphorous or amine-containing antioxidants for best radiation tolerance.

U.S. Pat. No. 5,340,848 describes a radiation resistant polypropylene resin composition comprising a polypropylene having a substantially syndiotactic structure with optional anti-oxidants and/or nucleating agents.

WO 92/14784 describes blends of from 30 to 40 weight percent of an ethylene-based copolymer with 70 to 30 weight percent of a propylene-based copolymer for use in heat seal applications.

The prior art makes it clear that a simple, cost effective system to provide radiation tolerant polypropylene has long been sought. Ideally, such a polypropylene composition would provide products that are clear and would be dimensionally stable at elevated temperatures. Such products could optionally be subjected to sterilization by means other than radiation without softening or deformation or significant deterioration of optical properties. It would further benefit the makers of polypropylene articles if the polymer blend used for forming would not tend to foul the molding equipment with oil or grease. Users of the final formed products, as well as makers of such articles would benefit if such polymer compounds would not exude oil or grease from the surface of molded parts. Such articles would be particularly attractive to the medical and food packaging industries. Our invention provides such a simple and commercially practical system.

SUMMARY OF THE INVENTION

This invention provides radiation tolerant polypropylene material that is a blend of polypropylene and a polymer produced using single site catalysis (SSC). Such polypropylene material is resistant to the softening effects of elevated temperature and is resistant to degradation when exposed to sterilizing doses of gamma and beta radiation. In a preferred embodiment, such material exhibits optical properties sufficient for a wide variety of end uses. Also provided is a process for producing such polypropylene material. Another embodiment of the invention concerns articles of manufacture which are produced from such polypropylene material.

DETAILED DESCRIPTION OF THE INVENTION

We have discovered that improved polypropylene blends for use in medical, food packaging, and related applications can be obtained by incorporating single-site catalyzed polymers, most preferably single-site catalyzed polyethylene. The resulting blends have enhanced tolerance to radiation and heat and have better clarity than conventional polypropylene blends.

The single-site catalyzed polyethylene is preferably produced using metallocene catalysis. Such polyethylene materials are commercially available from Exxon Chemical Company of Houston, Tex. under the trade name "Exact™". These materials may be made in a variety of processes (including slurry, solution, high pressure and gas phase) employing metallocene catalysts. Processes for making a variety of polyethylene materials with metallocene catalyst systems are well known. See, for example, U.S. Pat. No. 5,064,802.

Generally, polymers produced with metallocene catalysis display narrow molecular weight distribution, meaning that the ratio of the weight average molecular weight to the number average molecular weight will be equal to or below 4, most typically in the range of 1.7–4.0. Preferably, they will also display narrow composition distribution, meaning that the fractional comonomer content from molecule to molecule will be similar.

A useful method of measuring composition distribution is through employment of the "Composition Distribution Breadth Index" (CDBI), which is defined as the weight percent of the copolymer molecules having a comonomer content within 50% (that is 50% on each side) of the median total molar comonomer content. CDBI measurements can be made utilizing Temperature Rising Elution Fraction (TREF), as is now well known in the art. The technique is described by Wild et al. in the *Journal of Polymer Science, Polymer Physics Edition*, vol. 20, pg. 441 (1982). From weight fraction versus composition distribution curve, the CDBI is determined by establishing what weight percent of the sample has a comonomer content within 50%, on each side, of the median comonomer content. Further details relating to determining the CDBI of a copolymer are known to those skilled in the art. For example, PCT Patent Application WO 93/03093, published Feb. 18, 1993, and incorporated herein by reference, provides an improved means of measuring CDBI by recognizing and dealing with the low molecular weight fractions.

This invention provides processes for making polypropylene compositions that are radiation tolerant. The term "radiation tolerant" generally means resistant to the deterioration in mechanical properties, clarity, and color typically experienced by certain materials, such as polypropylene, when subjected to radiation. Of course, the acceptable level of radiation tolerance depends, at least in part, upon the application or end-use of the irradiated material. For example, in applications requiring very stiff, clear, and visually appealing articles, a smaller deterioration in properties may render the article useless, while other applications might be more forgiving.

The present invention provides a commercially useful means of imparting radiation tolerance to polypropylene compositions without significantly affecting the clarity or the processability of such polypropylene compositions. As is well known to those skilled in the art, blends of polypropylene and traditional, Ziegler-Natta-produced polyethylene tend to produce cloudy or hazy films and articles. The present invention, on the other hand, allows for the production of radiation tolerant films and articles that exhibit excellent optical properties. In fact, it is suprising that the SSC polyethylene could be added in significant quantities without severely diminishing the optical properties of the polypropylene composition. Also, ideally, the compositions of the present invention are highly resistant to the softening effects of elevated temperature.

The processes comprise blending propylene homo- or copolymer with about 1% to about 50% by weight ethylene homo- or copolymer produced by single site catalysis, having an MWD between about 1 and about 4, and a CDBI greater than about 45%.

In a preferred aspect, our invention provides food or medical packaging materials or articles, or medical devices, which may be clear and/or resistant to softening at elevated temperature. These are suited for sterilization by high energy radiation by themselves, with their contents, or they have been exposed to radiation sufficient for such sterilization. Such items or articles comprise blends of propylene homo- or copolymers with about 1% to about 50% by weight ethylene homo- or copolymer produced by single-site catalysis, having MWD between about 1 and about 4, CDBI greater than about 45%, or combinations thereof. Most preferably, sufficient SSC polyethylene is incorporated to provide tolerance for radiation doses up to 10 MRad. However, in some applications a lower radiation dosage, such as 2.5, 5.0 or 7.5 MRad could be used, permitting less SSC polyethylene to be used, such as 1% to 30% or 1% to 15% by weight, to achieve a desired level of radiation tolerance. Thus, the amount of SSC polyethylene required to produce a radiation tolerant propylene composition depends upon a variety of factors, such as the crystallinity of the polypropylene (or hexane extractables level), the radiation environment to which the composition is subjected, and the application or end-use of the composition. The present invention provides for a balance of physical properties, clarity, and radiation resistance, any or all of which can be optimized for a wide variety of commercial applications.

A preferred embodiment of this invention is packaging material or article or medical device, prepared for radiation sterilization of itself, its contents, or combinations, or which has been exposed to radiation sufficient for such sterilization comprising:

a) homopolypropylene;

b) about 1 wt % through about 50 wt % polyethylene produced by single-site catalysis;

c) about 0.01 through about 0.5 wt % hindered amine stabilizer; and, optionally, d) up to about 1.0 wt % secondary antioxidant of the thiodipropionate-type or up to about 0.5 wt % of the phosphite-type;

e) up to about 0.5 wt % clarifier or nucleator;

e) up to about 0.5 wt % acid neutralizing scavenger; or f) combinations thereof

In all aspects of this invention the polymer blends comprise 1 to 50 wt % ethylene homo- or copolymer produced by single site catalysis with the balance being polypropylene. Copolymerized polypropylene may also be used. Preferred ranges of SSC-produced polyethylene would be in the range of about 5 through about 15 wt %. Preferred ranges of hindered amine stabilizers would be about 0.02 through about 0.25 wt %. The preferred range for the preferred secondary antioxidant, a phosphite, would be about 0.02 through about 0.25 wt %; preferred ranges for the clarifier/nucleator would be about 0.1 through about 0.4 wt %; while the preferred range for the acid neutralizing scavenger, such as stearates or basic inorganic compounds, would be about 0.05 through about 0.15 wt %.

The ability of the blend to withstand high energy radiation without embrittlement increases with increasing amounts of ethylene polymer. The modulus, chemical resistance, resistance to softening at elevated temperature and other properties directly related to polymer crystallinity decrease with increasing amount of ethylene polymer in the blend. Although an ethylene polymer can be chosen for the blend which has minimum impact on the haze of the blend, generally increasing amounts of ethylene polymer may increase haze of the blends somewhat.

The ethylene polymer produced by single site catalysis and used as a partner with polypropylene in the blends of this invention may be drawn from the range of ethylene polymers from homopolymer with density of about 0.965 g/cc down through the copolymers with high comonomer content and density of about 0.85 g/cc. The molecular weight of the ethylene polymer used in the blends of this invention may be any value which allows the blends to function appropriately in the conversion processes and the intended use of the articles made from them, and can be measured using any well-known technique, such as by gel permeation chromatography. Ranges of molecular weights which are preferred for the blends may be specified by the use of the correlated measurement known as melt index ("MI"), measured according to ASTM D-1238, condition E. The ethylene polymers which are preferred because of their greater improvement of the radiation tolerance of the subject blends are those ranging in density from 0.865–0.920 g/cc. More preferred for their combination of good improvement in radiation tolerance and low impact on the appearance (low increase in haze) of the blends are the ethylene polymers ranging in density from 0.880–0.915 g/cc and MI from 2–11 dg/min. Most preferred for these same reasons are the resins in the density range from 0.895–0.910 g/cc and MI from 3–9 dg/min.

The ethylene based copolymers of this invention can contain any single type or combinations of comonomer units from a broad range of types which copolymerize effectively with ethylene in the presence of the single site catalysts. Generally, any comonomer or combinations of comonomer having Ziegler-polymerizable bonds will be useful in the practice of this invention. The polypropylene, the blend partner, or both may themselves be blends of polymers.

Our invention is useful for both homo-polypropylene and propylene copolymers. Likewise, our invention relates to polypropylene materials produced either by conventional catalysts like Ziegler-Natta systems or by metallocene catalysts, and comprising molecules of any of the types of tacticity (atactic, isotactic, or syndiotactic) combined in any proportions. Useful for their naturally better tolerance of high energy radiation, and high impact insults and their clarity are polypropylenes of relatively low crystallinity such as random copolymers containing relatively high proportions of comonomer units and isotactic and syndiotactic homo- and copolymers with relatively high occurrence of atacticity present along the polymer molecular chains as produced in the polymerization reactor.

Also, materials having useful properties and broad utility in food packaging, medical packaging, and medical device applications requiring the ability of a material to tolerate sterilizing treatments at elevated temperatures, such as by high pressure steam or in an autoclave, are the more highly crystalline polypropylenes such as highly isotactic or syndiotactic homopolymers containing a minimum of atactic component or character. However, isotactic material is preferred based on its availability.

To obtain a useful balance of impact strength, clarity, and tolerance of radiation and high temperature sterilization treatments, it will often be desirable to use as the polypropylene member of the blend a homo- or random copolymer displaying tacticity and crystallinity intermediate between the extremes described above. Thus a homopolymer or a random copolymer with low level of comonomer incorporation and with a moderate level of isotacticity would be particularly useful. A moderate level of syndiotacticity would also be useful. Homopolymers having a heptane insolubles level from about 88 to 99% are preferred, and homopolymers having a heptane insolubles level of from about 90 to 97% are more preferred.

The comonomer referred to in the above descriptions may be any of the monomers known to combine with propylene to produce the class of polymers commonly known as propylene random copolymers. Some representative but not limiting examples of this class of materials are $C_2$ to $C_{20}$ alpha-olefins, like ethylene, butene, pentene, hexene, heptene, octene, and so forth. Ethylene is the most common and preferred representative of this class, but to impart special properties into a copolymer, any of the others might be useful, particularly butene, hexene, and octene, which are also readily available and economically attractive. Other monomers of interest might be styrene, cyclohexene, other cyclic olefins, linear or cyclic dienes like 1,3-butadiene, 1,5-hexadiene, ethylidenenorbornene, etc. Longer chain α-olefins like 1-undecene, and 1-octadecene may also be used. The list of possible comonomers is far too large to enumerate here. The preceding list provides some examples representing the wide breadth of comonomers which may be present in the propylene polymer without in any way limiting the scope of the invention.

The polypropylene partner of the subject blends may be further characterized by any in a wide range of molecular weights and molecular weight distributions (MWDs) so long as a particular embodiment of the polypropylene member of the blend exhibits molecular weight and MWD suitable for the process required to convert the resin blend to a desired useful food packaging, medical packaging, or medical device article. Preferred for their enhanced resistance to high energy radiation are those resins with MWD in the lowest part of the range which is suitable for the conversion process. For example, in the case of injection molded medical devices, the polypropylenes of this invention can reasonably range in weight average molecular weight from 10,000 to 400,000 and in MWD from 1 to 9, measured as the ratio of weight average molecular weight to number average molecular weight as determined using well known means, such as gel permeation chromatography. Preferred from this range are polypropylenes with weight average molecular weight between 40,000 and 300,000 and MWD less than 6. Most preferred are the polypropylenes with weight average molecular weights in the range of about 50,000 through about 200,000 with MWD less than 4. The final molecular weight realized in the polypropylene formulation may be achieved by any of several means: by minimum breakdown of a resin during formulating and compounding in the presence of minimum mechanical shear and oxygen; by more severe, uncontrolled mechanical and oxidative degradation during formulating and compounding; or by the process often designated as the controlled rheology process in which a measured amount of an organic peroxide is used to reproducibly obtain breakdown of a higher molecular weight polymer to the desired, lower molecular weight. "Controlled rheology" materials and processes are generally described by Branchesi and Balbi, in "Mechanical and Structural Properties of As-Spun Polypropylene Filaments in Relation to Resin Rheology" published, at pages 27/1–9, by the Plastics and Rubber Institute's International Conference (November, 1989).

The articles manufactured from the blends of this invention exhibit improved resistance to discoloration and embrittlement on exposure to sterilizing doses of high energy radiation, as compared to otherwise identical formulations of polypropylene alone. Also, notably, articles of these compositions resist softening and distortion at high temperature.

Certain other aspects of the subject blends can be cited as contributing to the overall high level of radiation resistance they exhibit. Either of the polypropylene or polyethylene blending components or the finished blend itself may also contain a powerful chemical stabilizing additive useful for providing radiation tolerance to polypropylene such as a hindered amine light stabilizer (HALS). Preferred examples of this additive are the 2,2,4,4-tetramethylpiperidine derivatives such as N,N-bis(2,2,6,6-tetramethyl-4-piperidinyl)-1, 6-hexanediamine,bis(2,2,6,6-tetramethyl-4-piperidinyl) decanedioate, and the reaction product of dimethyl succinate plus 4-hydroxy-2,2,6,6-tetramethyl-1-piperidine-ethanol sold by Ciba-Geigy Corporation under the tradenames Chimassorb 944LD, Tinuvin 770, and Tinuvin 622LD, respectively. The HALS is employed at 0.01 to 0.5 wt % of the formulation, preferably from 0.02 to 0.25 wt %, and most preferably from 0.03 to 0.15 wt %.

The resistance to oxidative degradation of the formulations is also enhanced by the presence of a secondary antioxidant such as those of the thiodipropionate ester and the phosphite types. Preferred examples of the thiodipropionates are distearyl thiodipropionate (DSTDP) and dilaurylthiodipropionate (DLTDP), commercially available from Deer Polymer Corporation. Preferred embodiments of the phosphites are tris(2,4-di-t-butylphenyl)phosphite and bis(2, 4-di-t-butylphenyl)pentaerythritol diphosphite available as Irgafos 168 from Ciba-Geigy Corporation and Ultranox 626 available from General Electric Specialty Chemicals, respectively. Additives of this class may be optionally included in the subject blends at 0.01 to 0.50 wt % by weight of the formulation. Preferably, if used, they would be added at 0.02–0.25 wt % of the formulation, most preferably at 0.03–0.15 wt % of the formulation.

The additives included for the purpose of providing clarity to the blends of this invention are drawn from the general class of compound known as organic nucleating agents. In this class are a wide variety of chemical compositions, including but not limited to salts of benzoic and other organic acids, salts of partially esterified phosphoric acid, and dibenzylidene sorbitols. Preferred are the dibenzylidene sorbitols for their powerful clarifying effects. Most preferred are bis-4-methylbenzylidene sorbitol and bis-3,4,-dimethylbenzylidene sorbitol which are available from Milliken Chemical Company under the tradenames Millad 3940 and Millad 3988 respectively. When included in the formulations of the subject materials, these clarifying nucleators are used at from 0.05 to 1.0 wt % by weight of the composition, preferably from 0.1 to 0.5 wt %, and most preferably from 0.15 to 0.35 wt %.

In all of the above cases, the additives described may be incorporated into the blends of this invention as part of either of the major polymeric components of the blend or as an additional component added to the blend itself.

With respect to the physical process of producing the blend, sufficient mixing should take place to assure that a uniform blend will be produced prior to conversion into a finished product. Thus, in the cases of injection molding of medical devices, casting and blowing of packaging films, extrusion of tubing and profiles, etc. simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

Useful applications of the processes and materials, articles, and devices include food packaging material comprising: film and a self-supporting multilayered structure which includes: 1) metal foil, 2) cellulosic material, 3) opaque plastic film, or combinations thereof. This, of course includes simple wrapping film, film useful for bubble or blister packing, and the materials useful for producing the containers known as "liquid-boxes" as well as other useful pouches, bottles or hybrid-type containers. The useful food packaging materials may be formed by extrusion, blowing, lamination, or combinations thereof Further provided by the processes and applications are medical devices which are suitable for 1) intravenous (IV) use, 2) transport, storage, dispensing, or combinations thereof of medications, 3) surgical use, 4) medical examination, 5) culture growth, preparation, examination, or combinations thereof, 6) other laboratory operations, or 7) combinations thereof Such medical devices include such items as 1) IV catheter, probe, expanding device such as an arterial "balloon", or combinations thereof, 2) IV fluid container or dispenser, IV tubing, IV valve, IV injection port, unit-dose package, syringe or syringe barrel, or combinations thereof, 3) forceps, handle or holder for surgical instruments, surgical probe, curette, clamp or tying device, retractor, biopsy sampler, gowns, drapes, masks, filters, filter membranes, caps, booties, or combinations thereof, 4) speculum, probe, retractor, forceps, scraper, sampler, or combinations thereof, 5) culture dish, culture bottle, cuvette, smear slide, smear or sample container, or combinations thereof Further specific examples of useful medical devices which may be made by the practice of our invention include disposable and reusable hypodermic syringes, particularly the barrels and plunger parts. This would, of course, include prefilled hypodermic syringes for drug packaging and delivery as well as ancillary parts of syringes including needle hubs and needle sheaths. This will also include parts for parenteral kits including valves, cannula hubs, connectors, and cannula shields. Parts for catheters are also included, particularly cannula hubs, connectors, and cannula shields. Useful labware may also be produced including test tubes, culture tubes, and centrifuge tubes as well as vacuum blood collection tubes and ancillary parts including needle adapters/holders, and shields as well as drug vials, caps, and seals. Measuring devices such as droppers, eye-droppers, pipettes, and graduated feeding tubes, cylinders, and burets may also be usefully made by the practice of our invention as well as infant or disabled nursers and nurser holders.

Other useful articles and goods may be formed economically by the practice of our invention including: labware, such as roller bottles for culture growth and media bottles, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

These devices may be made or formed by any useful forming means for forming polyolefins. This will include, at least, molding including compression molding, injection molding, blow molding, and transfer molding; film blowing or casting; extrusion, and thermoforming; as well as by lamination, pultrusion, protrusion, draw reduction, rotational molding, spinbonding, melt spinning, melt blowing; or combinations thereof Use of at least thermoforming or film applications allows for the possibility of and derivation of benefits from uniaxial or biaxial orientation of the radiation tolerant material.

Those skilled in the art will recognize other unnamed applications and processes which fall within the scope of this invention. It is not our intent to exclude such applications and processes which are apparent in light of our description, but merely offer helpful exemplification of our invention.

In an effort to further clarify our invention, we provide a brief history and examples of our own testing. This is provided as exemplification not for limitation.

EXAMPLES

Four series of experiments were run to evaluate the radiation tolerance, clarity, and resistance to softening at elevated temperature of the blends of this invention. The crystallinity of propylene homopolymers was estimated from the relative parameter known as heptane insolubles or HI. HI is a measure of the portion of a finely divided polypropylene sample which is insoluble in boiling heptane (1.5 hour boiling time). As the HI approaches 100%, the crystallinity of the resin approaches a maximum level in commercially available polypropylenes, some of which are specifically formulated for radiation resistance, as available from Exxon Chemical Company in Houston, Tex. As is well known to those skilled in the art, the stabilization of polypropylene to high energy radiation becomes more difficult as the HI value increases.

Equipment used in our experimentation included various machines and instruments. Deflection at peak flexural load and secant modulus were determined on a Universal Testing Machine (Instron), Model 1122 or 1123 available from Instron Instrument Co. in Clinton, Mass., USA. Deflection temperature was measured with a Tinius Olsen Automatic Five Gang Deflection Temperature Tester available from the Tinius Olsen Testing Machine Company in Willow Grove, Pa., USA. Color was measured on a Hunter ULTRASCAN SN 7557 colorimeter (Hunter Associates Laboratories, Inc., Reston, Va.). Actual irradiation of samples was performed by Isomedix, Inc. in Morton Grove, Ill. Haze was measured using a Gardner Photometric Unit, Model PG 5500 (Pacific Scientific, Gardner Laboratory Division, Bethesda, Md.).

Examples 1–8

Stabilization of Irradiated Homopolymer Physical Properties

For this series, a nominal 1.0 dg/min melt flow rate (MFR, determined by ASTM D-1238, condition L) granular, iso-tactic propylene homopolymer produced by conventional Ziegler-Natta catalysis with high crystallinity represented by an HI of >95.5% was first processed with organic peroxide for the purpose of increasing its MFR to 25 dg/min and reducing its MWD to <4.0. Then seven blends corresponding to Examples 1 through 7 were compounded and extruded from a pelletizing extruder from the 25 dg/min MFR homopolymer, a variable quantity of EXACT™ 4017 and the following additives: 0.08% calcium stearate, 0.05% Tinuvin 622LD (Ciba Geigy Corporation, Hawthorne, N.Y.), 0.08% Ultranox 626 (General Electric Co., Parkersburg, W.Va.), and 0.25% of Millad 3940 Milliken and Co., Spartanburg, S.C.). EXACT™ 4017 is a neat ethylene-butene copolymer with density of 0.885 glcm$^3$ and having an MI of 4.0 dg/min.

Eight polymer samples were tested together; these are described below. Each polymer material tested was injection molded into sets of ASTM test parts in a family molding tool. Different portions of the dog bone shaped tensile bars (165 mm length×12.7 mm width×3.18 mm thickness), Gardner disks (88.9 mm diameter×3.18 mm thickness), and flex bars (127 mm length×12.7 mm width×3.18 mm thickness) were exposed to 0.0 and 7.5 MRad of Co$^{60}$ irradiation at approximately 1 MRad/hour rate. These samples were then exposed to accelerated aging at 60° C. for 21 days, an aging protocol recognized to approximately represent at least 24 months of real time aging. The specimens were then examined by the method informally known as "flex-to-failure", a test favored by the inventors for the determination of embrittlement of polymers following irradiation.

This test method is completely described in "Method for Evaluating the Gamma Radiation Tolerance of Polypropylene for Medical Device Applications" by R. C. Portnoy and V. R. Cross, a paper published in the Proceedings of the Society of Plastics Engineers 1991 Annual Technical Conference (Society of Plastics Engineers, Brookfield, Conn.). Briefly, the test consists of flexing a standard test specimen derived from the ASTM tensile bar in a three point bending mode as used in the determination of flexural modulus (ASTM D 790–86). The test is continued until a peak load is recorded. The deflection at which this peak load occurs is characteristic of the ductility of the specimen. For nearly all unirradiated polypropylenes this deflection is approximately 0.95–10.5 cm. The lower the deflection that is recorded in irradiated samples, the greater is the embrittlement that has resulted from the irradiation and aging protocol.

Another test applied to the irradiated and aged portions of the eight samples was the determination of color on the Gardner disks. The test was run according to the protocol developed by the instrument manufacturer, using the C illuminant, 10° light source, and having the port in the closed position. Other color scales and measurement instruments could be substituted in work of this type with comparable, relative results.

Color is an important characteristic of a polymer used in food packaging and medical applications. Generally, bluish white polymers are more desirable than yellowish ones. On the Hunter b scale employed here 0.0 is considered pure white. Negative values are more blue. Positive values are more yellow. The departure from pure white increases with the absolute value of the Hunter b measurement.

The use level of EXACT™ 4017 in each of the polymer blends for Examples 1–7 is given in Table 1A as the percent of total polymer by weight. Example 8 labeled as the "Standard" is the commercially available PP 9074MED which was used as received from Exxon Chemical Company of Houston, Tex., USA. This material is made specifically as being useful for radiation resistance, particularly in medical applications. The results of flex-to-failure and color measurements of the irradiated and unirradiated samples are also listed in Table 1A.

TABLE 1A

| Example | EXACT ™ 4017 Content by Weight % | Deflection at Peak Flexural Load cm, 0 MRad | 7.5 MRad | Color Hunter b Units 0 MRad | 7.5 MRad |
|---|---|---|---|---|---|
| 1 | 0.0 | 1.01 | 0.188 | 1.03 | 3.75 |
| 2 | 2.5 | 1.03 | 0.233 | 0.34 | 3.11 |
| 3 | 5.0 | 1.01 | 0.272 | −0.09 | 2.90 |
| 4 | 7.5 | 0.99 | 0.305 | −0.29 | 2.76 |
| 5 | 10.0 | 1.00 | 0.480 | −0.40 | 2.46 |
| 6 | 20.0 | 1.01 | 0.935 | −0.53 | 1.83 |
| 7 | 30.0 | 1.01 | 1.00 | −0.35 | 1.04 |
| 8 | (Standard) (PP 9074MED) | 1.01 | 0.737 | 1.69 | 3.61 |

The results in Table 1A show that with increasing amount of SSC-produced ylene based polymer the blends are increasingly resistant to embrittlement and coloration by high energy radiation. Note that even low amounts of SSC-produced ethylene based polymer in the blends result in significant reductions in radiation sensitivity. The blend of propylene homopolymer with 10% SSC-produced ethylene based polymer was almost as resistant to embrittlement by the high dosage of radiation as the commercial radiation tolerant random copolymer, PP 9074MED. Blends with higher levels of ethylene polymer were more resistant to embrittlement than the PP 9074MED. All of the blends started less yellow and remained less yellow after irradiation than the PP 9074MED. Blends with high levels of EXACT™ 4017 remained extremely white after irradiation. Overall, the blends ere very resistant to radiation degradation.

To demonstrate the stiffness of the blends and their resistance to softening at elevated temperatures, the results of two additional measurements were made on the unirradiated and unaged portions of the samples of Examples 1–8. These are recorded in Table 1B. The secant flexural modulus at 1% flexural deflection is a measure of the stiffness of polymers which was determined in the same flex-to-failure testing procedure and using the same testing specimens and equipment used for measurement of the deflection at peak flexural load. The heat deflection temperature was measured on the flex bar specimens according to the method of ASTM D648–82 at a flexural load of about 455 kPa (66 psi).

TABLE 1B

| Example | Secant Flexural Modulus at 1% Deflection, kPa | Deflection Temperature at 455 kPa (66 psi), °C. |
|---|---|---|
| 1 | 1.68 × 10⁶ | 101 |
| 2 | 1.61 × 10⁶ | 103 |
| 3 | 1.52 × 10⁶ | 101 |
| 4 | 1.43 × 10⁶ | 105 |
| 5 | N.A. | 90 |
| 6 | 1.26 × 10⁶ | 93 |
| 7 | 0.89 × 10⁶ | 79 |
| 8 | 1.14 × 10⁶ | 81 |

Figure 1:
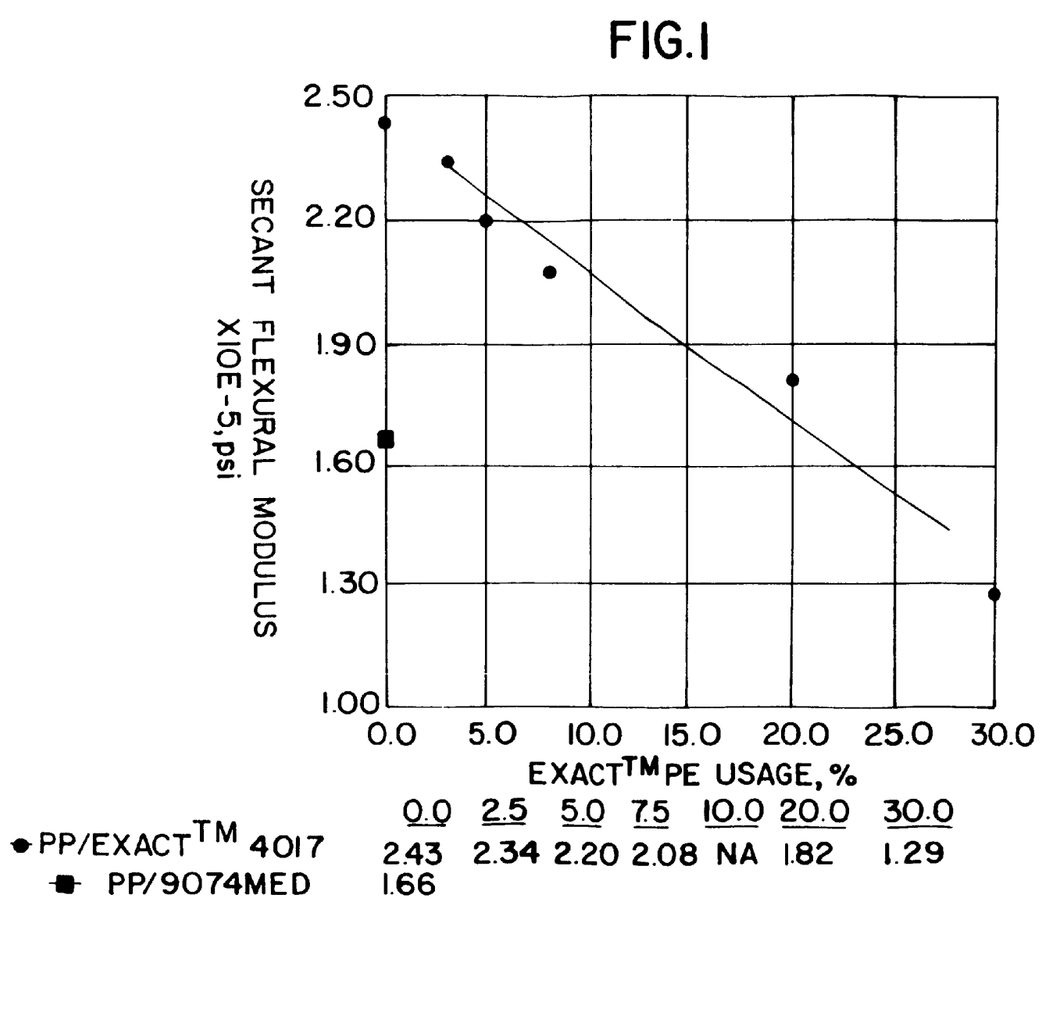
FIG. 1 provides a plot of secant flexural modulus against content of SSC-produced polyethylene in polypropylene for Examples –8.
Figure 2:
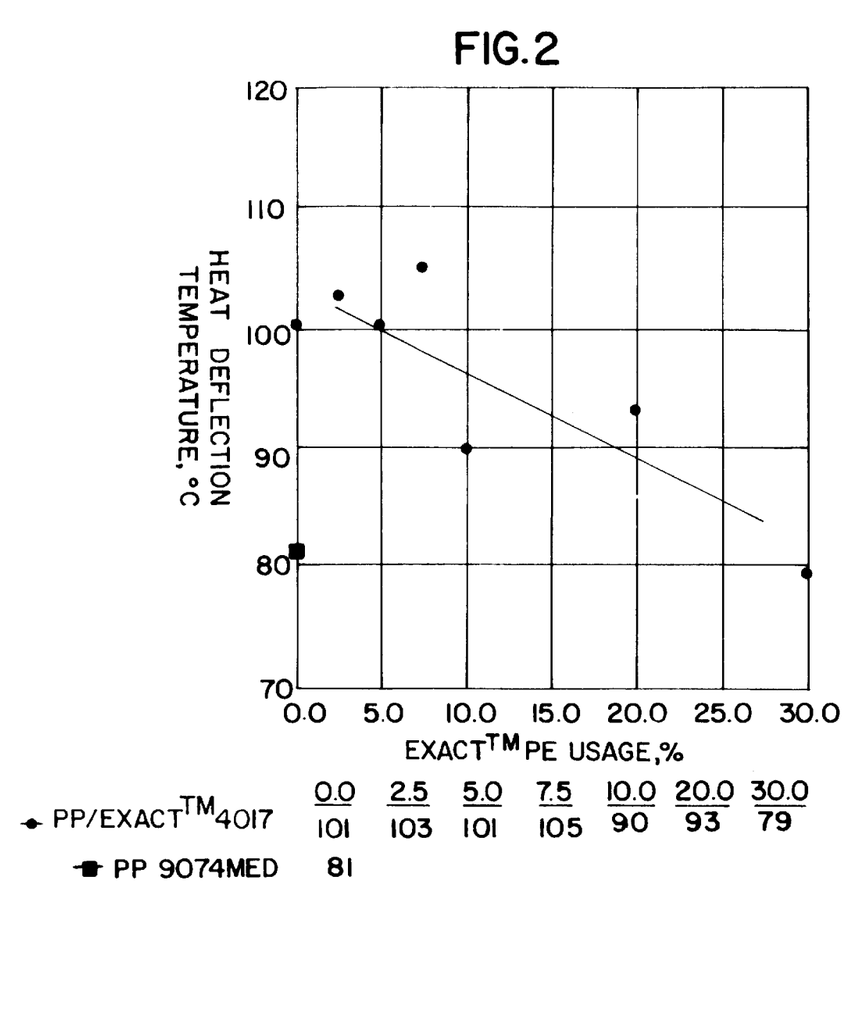
FIG. 2 provides heat deflection temperatures plotted against content of SSC-produced polyethylene in polypropylene for Examples 1–8.

As expected, increasing SSC-produced PE in the blends of Examples 1–7 ed decreases in the room temperature stiffness and resistance to softening at elevated temperature. But the trend lines plotted from this data in FIGS. 1 and 2 predict that blends can be identified with excellent utility for resistance to embrittlement and discoloration by high energy radiation and which have room temperature secant modulus and deflection temperatures characteristic of non-clarified, autoclavable propylene homopolymers, e.g. those blends in the 5–15% PE range.

Examples 9–15

Effect of Blending Agent on Haze of the Polypropylene

Solid state pellet blends of PP 9374MED, another commercially available propylene copolymer formulation sold by Exxon Chemical Company for use in applications requiring clarity and tolerance of sterilizing doses of high energy radiation, and three SSC-produced ethylene polymers were prepared in 90:10 weight ratios (PP 9374MED:ethylene polymer). The three ethylene polymers used in these blends were EXACT™ 4033 with a 0.880 g/cc density and 0.8 dg/min MI, EXACT™ 3035 with 0.903 g/cc density and 3.5 dg/min MI, and EXACT™ 4028 having a 0.880 g/cc density and 10.0 dg/niin MI, all commercially available products of Exxon Chemical Company and used as received from the manufacturer. Half of each pellet blend was melt blended and repelletized. Each of the six samples and a control sample consisting of neat PP 9374MED itself, as a standard, were then molded into haze plaques about 76.2 mm long× 50.8 mm wide×1.02 mm thick. The plaques were conditioned for 48 hours and the haze was measured according to ASTM 1003–92. The results of this work are shown in Table 2.

TABLE 2

| Example | Blend Method | Exact ™ Resin Grade | MI, dg/min | Density, g/cc | Haze, % |
|---|---|---|---|---|---|
| 9 | Pellet | 4033 | 0.8 | 0.880 | 23.7 |
| 10 | Melt | 4033 | 0.8 | 0.880 | 28.0 |
| 11 | Pellet | 3035 | 3.5 | 0.900 | 6.9 |
| 12 | Melt | 3035 | 3.5 | 0.900 | 7.5 |
| 13 | Pellet | 4028 | 10.0 | 0.880 | 11.2 |
| 14 | Melt | 4028 | 10.0 | 0.880 | 11.4 |
| 15 | NA PP (937MED) (Standard) | NA | NA | NA | 7.9 |

The results of the haze measurements of Examples 9–15 demonstrate that the effect of a moderate quantity of the SSC-produced ethylene-based polymer on the haze of blends with clarified polypropylene can range from negligible as in Examples 11 and 12, to very significant as in Examples 9 and 10. The difference in this effect on blends which were melt processed prior to molding and those which were just mixed from solid state pellets appeared to be very small.

Examples 16–22

Effect of SSC-Produced Ethylene Polymers on the Haze of Clarified Polypropylene

Solid state pellet blends of the propylene homopolymer used in Example 1 and each of several EXACT™ resins were produced with a 90:10 weight ratio of polypropylene to polyethylene. Samples of each of these blends were then injection molded into about 1.02 mm thick haze plaques, and the haze was measured on the conditioned plaques all as described for Examples 9–15. These Examples 16–21 are fully described in Table 3, where the results of the haze measurements for these blends are also given.

TABLE 3

| Example | Exact ™ Resin Grade | Comonomer | MI, dg/min | Density, g/cc | Haze, % |
|---|---|---|---|---|---|
| 16 | 3035 | Butene | 3.5 | 0.900 | 13.2 |
| 17 | 4042 | Butene | 1.1 | 0.899 | 18.6 |
| 18 | 3001 | Butene | 4.5 | 0.910 | 14.2 |
| 19 | 4024 | Butene | 3.8 | 0.885 | 21.9 |
| 20 | 3018 | Propylene | 4.0 | 0.901 | 13.4 |
| 21 | 5010 | Propylene | 4.0 | 0.865 | 49.9 |
| 22 | 3015 | Propylene | 10.0 | 0.901 | 11.8 |

Table 3 demonstrates a wide range of haze and suggests caution in choice of blending agent if high clarity is desired. As a general observation, it does not appear that high haze is associated with one comonomer for the SSC-produced polyolefin, but rather that comonomer content, which generally increases with decreasing density, and MI may be the more important factors. The results of Table 3 further demonstrate that blends of a substantial quantity of SSC-produced polyethylene with clarified polypropylene can be very clear.

Examples 23–32
Confirmation of the Ability to Realize Clarity, Stiffness, and Resistance to both Radiation and Softening at Elevated Temperature in a Single Blend An experiment similar to that involving Examples 1–8 was conducted with blends of a single, clarified propylene homopolymer and three levels each of three different SSC-produced polyethylenes. The purpose of this work was to verify the ability to produce a single blend of polypropylene and SSC-produced polyethylene embodying all four of the desirable characteristics of high clarity, resistance to sterilizing doses of high energy radiation, propylene homopolymer-like stiffness, and resistance to softening at elevated temperature.

A nominal 1.3 MFR granular, isotactic propylene homopolymer was converted to a stock blending compound by treating it in a pelletizing extruder with organic peroxide to raise its MFR to about 25 dg/min and reduce its MWD to less than about 4.0 and then melt blending it with 0.03% DHT4A (synthetic hydrotalcite, Kyowa Chemical Industry Co., Ltd., Kagawa, Japan), 0.06% GMS-11 (glycerol monostearate, Lonza, Fairlawn, N.J.), 0.25% Millad 3988 (Milliken and Co., Spartanburg, S.C.), 0.10% Tinuvin 622LD (Ciba Geigy Corporation, Hawthorne, N.Y.), and 0.08% Ultranox 626 (General Electric Co., Parkersburg, W.Va.). This propylene homopolymer formulation is denoted as Example 23. Then nine blends of the solid state polypropylene pellets were prepared corresponding to three levels each of three different SSC-produced ethylene-butene copolymers. The blends with the ethylene-butene copolymers are fully described in Table 4 as Examples 24–32. Of the SSC-produced polyethylenes referenced in Table 4 EXACT™ 3024 is a commercially available neat polymer product of Exxon Chemical Company with 0.905 g/cc density and 4.5 dg/min MI; SLP 9043 is an unmodified single-site catalyst produced ethylene copolymer, which is commercially available from Exxon Chemical Company, having 0.887 g/cc density and 2.2 dg/min MI. EXP is a single-site catalyst-produced unmodified ethylene copolymer resin having 0.905 g/cc density and 9.0 dg/min MI. The EXP ethylene-butene copolymer used is identical to EXACT™ 3022, except that the EXP ethylene-butene copolymer does not contain the antioxidant additive contained in EXACT™ 3022. Both EXACT™ 3022 and EXP ethylene-butene copolymer are commercially available from the Exxon Chemical Company, Houston, Tex.

The 10 materials of Examples 23–32 were molded into ASTM test parts, irradiated, aged, and tested exactly as described for Examples 1–8. The results of the tests are recorded in Tables 4A and 4B.

TABLE 4A

| | | | Deflection at Peak Flexural Load, (cm) | | Color (Hunter b Units) | |
|---|---|---|---|---|---|---|
| Example | Resin Grade | Content (Wt %) | 0.0 MRad | 7.5 MRad | 0.0 MRad | 7.5 MRad |
| 23 | 100% PP | N/A | 0.991 | 0.300 | 0.14 | 1.49 |
| 24 | EXACT™ 3024 | 5 | 0.988 | 0.325 | −0.06 | 1.04 |
| 25 | EXACT™ 3024 | 10 | 1.001 | 0.610 | −1.15 | 0.73 |
| 26 | EXACT™ 3024 | 15 | 1.008 | 0.772 | −1.23 | −0.64 |
| 27 | SLP 9043 | 5 | 1.021 | 0.386 | −0.55 | 0.88 |
| 28 | SLP 9043 | 10 | 1.001 | 0.498 | −0.70 | 0.48 |
| 29 | SLP 9043 | 15 | 1.024 | 0.691 | −0.88 | 0.64 |
| 30 | EXP | 5 | 1.001 | 0.429 | 0.03 | 0.75 |
| 31 | EXP | 10 | 1.026 | 0.528 | −0.04 | 0.56 |
| 32 | EXP | 15 | 1.016 | 0.658 | −1.23 | −0.85 |

TABLE 4B

| Example | Secant Flexural Modulus at 1% Deflection, kPa | Deflection Temperature at 455 kPa | Haze, % |
|---|---|---|---|
| 23 | $1.53 \times 10^6$ | 95.9 | 12.2 |
| 24 | $1.46 \times 10^6$ | 97.2 | 12.7 |
| 25 | $1.34 \times 10^6$ | 92.8 | 13.2 |
| 26 | $1.26 \times 10^6$ | 88.9 | 13.7 |
| 27 | $1.45 \times 10^6$ | 100.8 | 22.8 |
| 28 | $1.34 \times 10^6$ | 92.8 | 27.8 |
| 29 | $1.26 \times 10^6$ | 88.1 | 29.0 |
| 30 | $1.48 \times 10^6$ | 97.0 | 13.4 |
| 31 | $1.35 \times 10^6$ | 94.3 | 14.3 |
| 32 | $1.32 \times 10^6$ | 90.7 | 15.3 |

Figure 3:
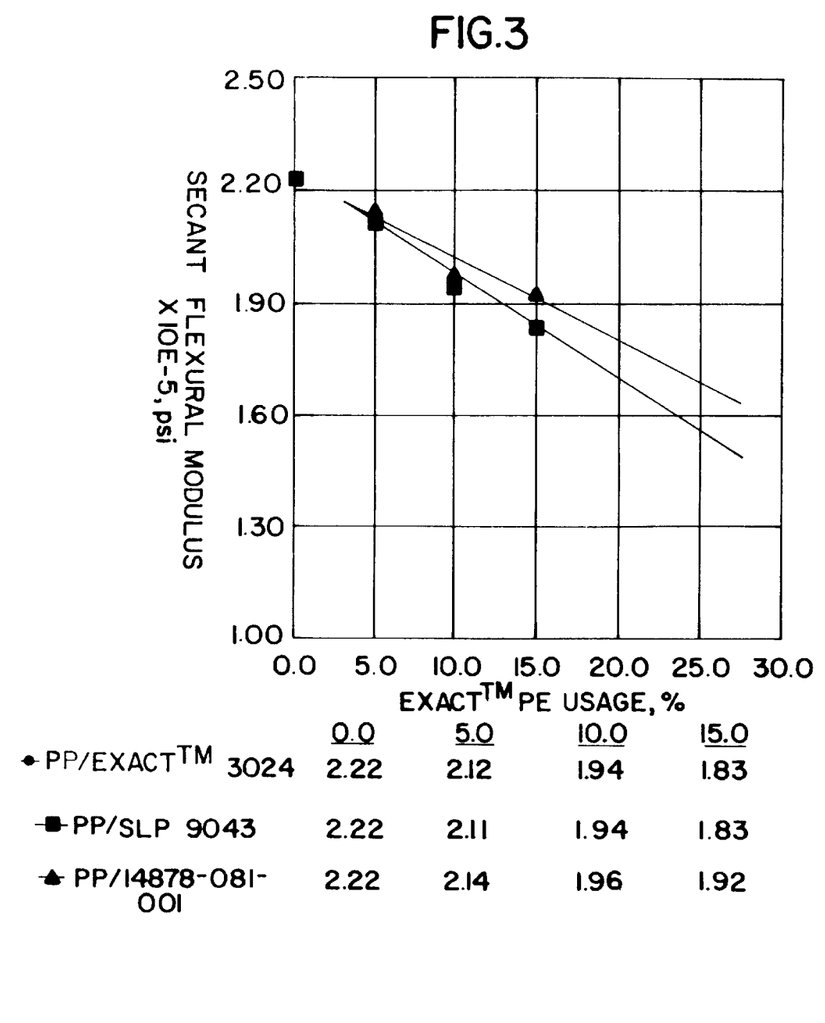
FIG. 3 provides a plot of secant flexural modulus against content of SSC-produced polyethylene in polypropylene for Examples 23–32.
Figure 4:
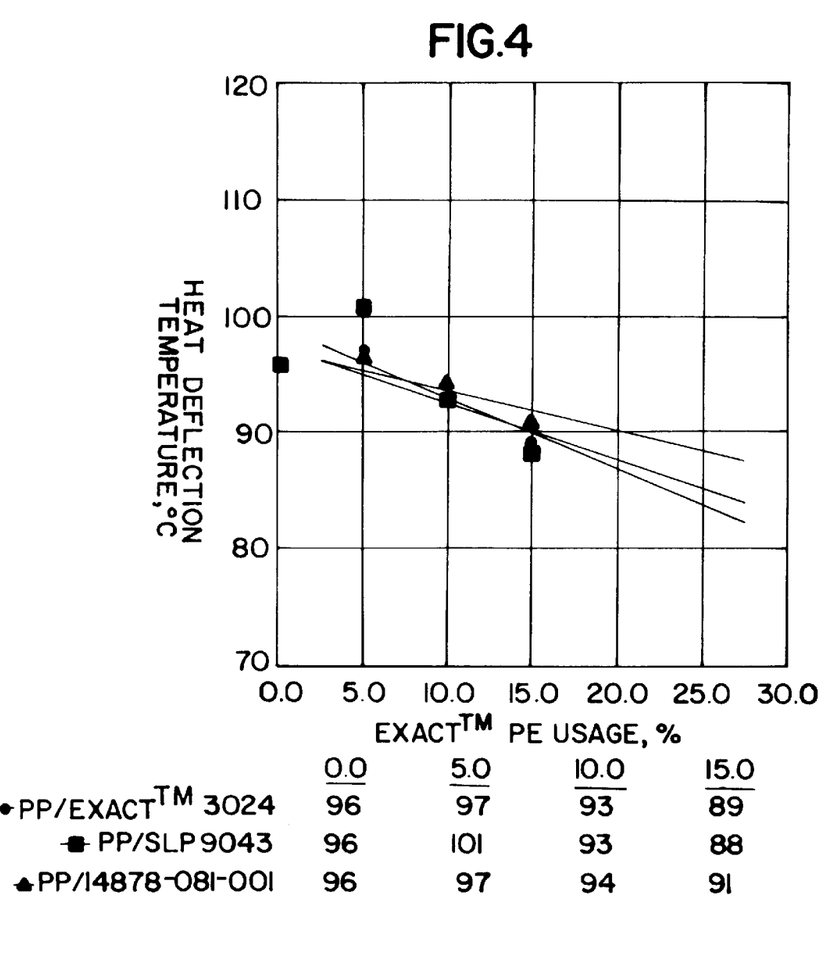
FIG. 4 provides heat deflection temperatures plotted against content of SSC-produced polyethylene in polypropylene for Examples 1–8 and 23–32.

For the purpose of elucidating the trends inherent in the response of the moduli and heat deflection temperatures to the increasing quantity of SSC-produced ethylene polymers in the blends of Examples 23–32 the regression lines of FIGS. 3 and 4 were plotted.

The results of the experiments involving Examples 23–32 are displayed in Tables 4A and 4B and FIGS. 3 and 4 confirm that 5–15% of any of a wide variety of SSC-produced ethylene polymers will similarly provide blends with polypropylene significant stabilization of the physical properties and color to the effects of treatment with high energy radiation. They further demonstrate that in addition to their color stabilizing effect, the SSC-produced ethylene polymers provide a whitening effect in the blend even in the absence of any irradiation. Also they show again that the effect of the polyethylene component on the clarity of the blend may range from negligible to substantial depending upon the polyethylene which is used. They reconfirm that blends of the special polyethylenes and nucleated homopolymers have relatively high stiffness and resistance to softening at elevated temperatures, higher than for propylene random copolymers with comparable resistance to degradation by irradiation. Lastly they show that SSC-produced polymers generally provide a blend with excellent resistance to the embrittlement and discoloration caused by high energy radiation while having almost no effect upon the haze of the material.

Examples 33–42

A Statistically Designed Experiment for the Systemization of the Effects of SSC-produced Ethylene Polymers Upon the Haze of Blends with Polypropylene To systematize the understanding of the effects of the significant characteristics of the SSC-produced ethylene polymers upon the haze of blends made with them, a statistically designed experiment was carried out on Examples 33–42. This experiment was performed exactly as the one involving Examples 16–22, which are blends of 10% by weight of polyethylenes with propylene homopolymer, but using the propylene homopolymer corresponding to Example 23 and the SSC-produced ethylene polymers (described in Table 5) which were dictated by the statistical design. The design chosen was based on three levels each of density and melt index, the two variables in the range of EXACT™ commercially available SSC-produced ethylene polymers which have been shown to impact the haze of the blends. A full factorial design gave nine experiments, but one combination of factors did not exist in a readily available resin. After eliminating this non-existent combination, adding in two additional runs of the central point of the design for good error estimation, and randomizing the design, the experimental plan shown in Table 5 was produced. The haze results of the experiment are likewise include in Table 5.

TABLE 5

| Run | Example | Exact ™ Resin Grade | MI, dg/min | Density, g/cm$^3$ | Haze, % |
| --- | --- | --- | --- | --- | --- |
| 1 | 33 | 4024 | 3.8 | 0.885 | 19.6 |
| 2 | 34 | 5008 | 10.0 | 0.865 | 23.6 |
| 3 | 35 | 4028 | 10.0 | 0.880 | 20.8 |
| 4 | 36 | 3024 | 4.5 | 0.905 | 12.7 |
| 5 | 37 | 4049 | 4.5 | 0.873 | 29.6 |
| 6 | 38 | 4024 | 3.8 | 0.885 | 19.4 |
| 7 | 39 | 3025 | 1.2 | 0.910 | 25.2 |
| 8 | 40 | 4033 | 0.8 | 0.880 | 69.0 |
| 9 | 41 | 4024 | 3.8 | 0.885 | 22.7 |
| 10 | 42 | 3022 | 9.0 | 0.905 | 16.2 |

Figure 5:
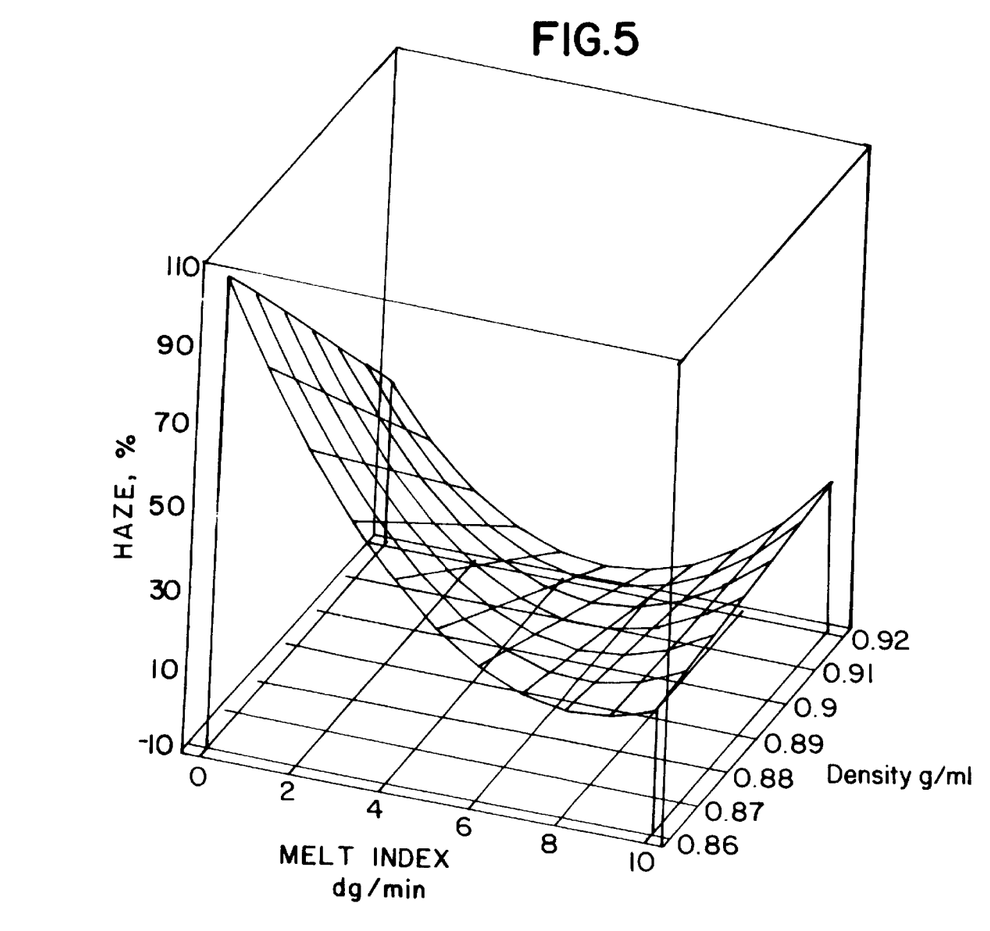
FIG. 5 provides a surface response curve relating haze, melt index, and density for homopolypropylene blends with SSC-produced polyethylene.

Processing these results by a multiple regression technique provided in the computer program STATGRAPHICS, Version 3.0, available from Statistical Graphics Corporation, yielded this empirical equation for the dependence of haze in the blends upon density ($\rho$) and melt index (MI) of the polyethylene component with a correlation coefficient ($R^2$) of 0.91:

$$\text{Haze, \%} = 1185.5 + 1.3210(MI)^2 - 139.64(MI) - 1255.6\rho + 137.15[(MI)\rho]$$

FIG. 5 is a response surface plot of this relationship which graphically emphasizes that the blends of 25 dg/min homopolymer with lowest haze occur with SSC-produced polyethylenes having melt indices between 4 and 8 dg/min at densities greater than 0.89. The results of this experiment and those of Examples 9–22 further suggest that optimum choices of SSC-produced ethylene polymers can be established to provide high clarity blends with a wide range of propylene polymers using the techniques described here.

It is apparent that this system of blending SSC-produced polyolefins offers opportunities to create numerous useful blends of polypropylene with SSC-produced polyolefins, particularly polyethylenes, which combine the useful characteristics of clarity, resistance to softening at elevated temperature, and radiation tolerance without introducing problems with oily components or with yellowing and embrittlement after sterilization with high energy radiation.

We claim:

1. An article of manufacture which has been exposed to radiation sufficient for sterilization, comprising a blend of from about 50 to about 99 wt % polypropylene with from about 1 to about 50 wt % polyethylene, said polyethylene having a molecular weight distribution between about 1 and about 4, and a composition distribution breadth index greater than about 45% wherein the amount of polyethylene present in the blend is sufficient to increase the radiation tolerance of the article over that of the polypropylene alone.

2. The article of claim 1, wherein said article is a film.

3. The article of claim 1, wherein said article is packaging material.

4. The article of claim 3, wherein said packaging material is a self supporting multilayered structure.

5. The article of claim 4, wherein said self supporting multilayered structure comprises plastic film.

6. The article of claim 4, wherein said self supporting multilayered structure comprises metal foil.

7. The article of claim 4, wherein said self supporting multilayered structure comprises cellulosic material.

8. The article of claim 3, wherein said packaging material is selected from the group consisting of unit-dose packs, blister packs, bubble packs, wrapping material, and containers for food preserved by irradiation.

9. The article of claim 3, wherein said packaging material is formed by a process selected from the group consisting of extrusion, blowing, blow-molding, and lamination, and wherein the increased radiation tolerance of the article is evidenced by less embrittlement after treatment with up to 10 MRads of gamma or beta radiation than would be evidenced by the same article made from the polypropylene.

10. The article of claim 1, wherein said article is a medical device.

11. The article of claim 10, wherein said medical device is formed by a process selected from the group consisting of extrusion, blowing, lamination, blow molding, transfer molding, injection molding, pultrusion, protrusion, draw reduction, rotational molding, spinbonding, melt spinning, and melt blowing.

12. The article of claim 1, wherein said article has been subjected to radiation in an amount up to about 10 MRad.

13. The article of claim 1, wherein said polyethylene has a molecular weight distribution between about 1.7 and 4.

14. The article of claim 1, wherein said polypropylene is a random copolymer comprising propylene and at least one other alpha-olefin.

15. The article of claim 14, wherein said alpha-olefin is selected from the group consisting of ethylene, butene, hexene, and octene.

16. The article of claim 1, wherein said polypropylene is a homopolymer.

17. The article of claim 1, wherein said polypropylene has a weight average molecular weight of from 10,000 to 400,000 and a molecular weight distribution of from 1 to 9.

18. The article of claim 1, wherein said polypropylene has a weight average molecular weight of from 40,000 to 300,000 and a molecular weight distribution of from 1 to 6.

19. The article of claim 1, wherein said polypropylene has a weight average molecular weight of from 50,000 to 200,000 and a molecular weight distribution of from 1 to 4.

20. The article of claim 1, wherein said polyethylene has a density of from 0.865 g/cc to 0.920 g/cc.

21. The article of claim 1, wherein said polyethylene has a density of from 0.880 g/cc to 0.915 g/cc and a melt index of from 2 to 11 dg/min.

22. The article of claim 1, wherein said polyethylene has a density of from 0.895 g/cc to 0.910 g/cc and a melt index of from 3 to 9 dg/min.

23. An article which has been exposed to radiation sufficient for sterilization, comprising:
   a) from about 50 to about 99 wt % propylene homopolymer;
   b) from about 1 to about 50 wt % polyethylene produced by single-site catalysis; and
   c) from about 0.01 to about 0.5 wt % hindered amine stabilizer, wherein the polyethylene is present in an amount sufficient to increase the radiation tolerance of the article over that of the propylene homopolymer alone.

24. The article of claim 23, further comprising up to about 1 wt % of a thiopropionate secondary antioxidant.

25. The article of claim 24, wherein said thiodiproprionate secondary antioxidant is selected from the group consisting of distearyl thiodipropionate and dilaurylthiodipropionate.

26. The article of claim 23, further comprising up to about 0.5 wt % of a phosphite secondary antioxidant.

27. The article of claim 26, wherein said phosphite secondary antioxidant is present in the amount from about 0.02 to about 0.2 wt %.

28. The article of claim 26, wherein said phosphite secondary antioxidant is present in the amount from about 0.03 to about 0.15 wt %.

29. The article of claim 26, wherein said phosphite secondary antioxidant is selected from the group consisting of tris(2,4-di-t-butylphenyl)phosphite and bis(2,4-di-t-butylphenyl)pentaerythritol diphosphite.

30. The article of claim 23, further comprising up to about 0.5 wt % clarifying nucleator.

31. The article of claim 30, wherein said clarifying nucleator is present in the amount from about 0.15 to about 0.1 wt %.

32. The article of claim 30, wherein said clarifying nucleator is present in the amount from about 0.15 to about 0.35 wt %.

33. The article of claim 30, wherein said clarifying nucleator is selected from the group consisting of bis-4-methylbenzylidene sorbitol and bis-3,4-dimethylbenzylidene sorbitol.

34. The article of claim 23, further comprising up to about 15 wt % acid neutralizing scavenger.

35. The article of claim 34, wherein said acid neutralizing scavenger is present in the amount from about 0.05 to about 0.1 wt %.

36. The article of claim 23, wherein said article is packaging material.

37. The article of claim 23, wherein said article is a medical device.

38. The article of claim 23, comprising from about 5 to about 15 wt % polyethylene produced by single-site catalysis.

39. The article of claim 23, comprising from about 0.02 to about 0.2 wt % hindered amine stabilizer.

40. The article of claim 23, comprising from about 0.03 to about 0.15 wt % hindered amine stabilizer.

41. The article of claim 23, wherein said hindered amine stabilizer is selected from the group consisting of N,N'-bis (2,2,6,6-tetramethyl-4-piperidinyl)-1,6-hexanediamine, bis (2,2,6,6-tetramethyl-4-piperidinyl)decanedioate, and the reaction product of dimethyl succinate plus 4-hydroxy-2,2,6,6-tetramethyl-1-piperidine-ethanol.

42. An article of manufacture suitable for radiation sterilization or which has been exposed to radiation sufficient for such sterilization, comprising a blend of from about 80 to about 99 wt % polypropylene with about 1 to about 20 wt % polyethylene, said polyethylene having a molecular weight distribution between about 1 and about 4, and a composition distribution breadth index greater than about 45%, wherein the amount of the polyethylene present is selected to be sufficient to increase the radiation tolerance of the article over that of the polypropylene alone.

43. The article of claim 42, wherein said article is a film.

44. The article of claim 42, wherein said article is packaging material.

45. The article of claim 42, wherein said article is a medical device.

46. The article of claim 42, wherein said article has been subjected to radiation in an amount of between about 2.5 and about 10 MRad.

47. The article of claim 42 wherein said polyethylene has a density of from 0.865 g/cc to 0.920 g/cc.

48. The article of claim 42, further comprising from about 0.01 to about 0.5 wt % hindered amine stabilizer.

49. The article of claim 42, further comprising up to about 1 wt % of a secondary antioxidant.

50. The article of claim 42, further comprising up to about 0.5 wt % clarifying nucleator.

51. The article of claim 42, further comprising up to about 15 wt % acid neutralizing scavenger.

52. A process for producing a sterilized article, comprising
   blending from about 50 to about 99 wt % polypropylene with from about 1 to about 50 wt % polyethylene, said polyethylene having a molecular weight distribution between about 1 and about 4, and a composition distribution breadth index greater than about 45%, wherein the amount of polyethylene present in the blend is sufficient to increase the radiation tolerance of the article over that of the polypropylene alone,
   producing an article from said blend, and
   subjecting said article to radiation.

53. The process of claim 52, wherein said article is subjected to radiation in an amount of up to 10 MRad.

* * * * *